(12) United States Patent
Streibig

(10) Patent No.: US 6,767,097 B2
(45) Date of Patent: Jul. 27, 2004

(54) COLORED CONTACT LENS AND METHOD OF MAKING SAME

(76) Inventor: Daniel G. Streibig, 528 Ballwood, Ballwin, MO (US) 63021

( * ) Notice: Subject to any disclaimer, the term of this patent is extended or adjusted under 35 U.S.C. 154(b) by 52 days.

(21) Appl. No.: 09/821,620

(22) Filed: Mar. 29, 2001

(65) Prior Publication Data

US 2002/0140900 A1 Oct. 3, 2002

(51) Int. Cl.[7] .............................................. G02C 7/04
(52) U.S. Cl. .................................. 351/162; 351/160 R
(58) Field of Search ............................ 351/162, 160 R, 351/160 H, 161

(56) References Cited

U.S. PATENT DOCUMENTS

| | | | |
|---|---|---|---|
| D211,757 S | 7/1968 | Urbach ...................... D16/101 |
| 3,476,499 A | 11/1969 | Wichterle ...................... 8/507 |
| 3,536,386 A | 10/1970 | Spivack .................. 351/160 R |
| 3,679,504 A | 7/1972 | Wichterle .................... 156/62 |
| 3,712,718 A | 1/1973 | LeGrand et al. ........ 351/160 R |
| 4,252,421 A | 2/1981 | Foley, Jr. .................... 351/162 |
| 4,460,523 A | 7/1984 | Neefe ......................... 264/1.9 |
| 4,472,327 A | 9/1984 | Neefe ......................... 264/1.9 |
| 4,525,044 A | 6/1985 | Bauman ................. 351/160 H |
| 4,582,402 A | 4/1986 | Knapp ........................ 351/162 |
| 4,668,240 A | 5/1987 | Loshaek ........................ 8/507 |
| 4,681,412 A | 7/1987 | Lemelson ................... 351/162 |
| 4,701,038 A | 10/1987 | Neefe .......................... 351/162 |
| 4,704,017 A | 11/1987 | Knapp ........................ 351/162 |
| 4,709,657 A | 12/1987 | Gothard ...................... 119/253 |
| 4,719,657 A | 1/1988 | Bawa ........................... 8/453 |
| 4,720,188 A | 1/1988 | Knapp ........................ 351/177 |
| 4,744,647 A | 5/1988 | Meshel et al. ............... 351/177 |
| 4,745,857 A | 5/1988 | Putnam et al. ................. 101/44 |
| 4,840,477 A | 6/1989 | Neefe ......................... 351/162 |
| 4,867,552 A | 9/1989 | Neefe ......................... 351/162 |
| 4,872,405 A | 10/1989 | Sterman ...................... 101/44 |
| 4,889,421 A | 12/1989 | Cohen ......................... 351/162 |
| 4,946,269 A | 8/1990 | Magdassi .................... 351/162 |
| 4,981,487 A | 1/1991 | da Costa ........................ 8/507 |
| 5,120,121 A | 6/1992 | Rawlings et al. ........... 351/162 |
| 5,126,531 A | 6/1992 | Majima et al. ......... 219/121.68 |
| 5,158,718 A | 10/1992 | Thakrar et al. ............. 264/1.36 |
| 5,160,463 A | 11/1992 | Evans et al. ................ 264/1.7 |
| 5,205,212 A | 4/1993 | Wolfe ......................... 101/170 |
| 5,244,470 A | 9/1993 | Onda et al. .................... 8/507 |
| 5,272,010 A | 12/1993 | Quinn ..................... 428/411.1 |
| 5,302,978 A | 4/1994 | Evans et al. ................ 351/162 |
| 5,307,704 A | 5/1994 | Müller et al. ................. 74/411 |
| 5,414,477 A | 5/1995 | Jahnke ........................ 351/162 |
| 5,467,149 A | 11/1995 | Morrison et al. ........... 351/162 |
| 5,637,265 A | 6/1997 | Misciagno et al. ............ 449/6 |
| 5,704,017 A | 12/1997 | Heckerman et al. .......... 706/12 |
| 5,731,898 A | 3/1998 | Orzi et al. ................... 359/587 |
| 5,733,333 A | 3/1998 | Sankey ......................... 623/41 |

(List continued on next page.)

FOREIGN PATENT DOCUMENTS

| | | | |
|---|---|---|---|
| CA | 710230 | 5/1965 | |
| EP | 0369942 | 5/1990 | |
| EP | 0390443 | 10/1990 | |
| EP | 0484044 | 5/1992 | |
| JP | 112566 | 5/1996 | ............ B05D/1/02 |
| WO | WO 83/03480 | 10/1983 | |
| WO | WO 91/06886 | 5/1991 | |
| WO | WO 01/40846 | 6/2001 | |

Primary Examiner—Jordan M. Schwartz
(74) Attorney, Agent, or Firm—Thompson Coburn LLP

(57) ABSTRACT

A method for coloring a contact lens. The method comprises providing a contact lens having a pupil region and a generally annular-shaped iris region surrounding the pupil region. The iris region is adapted to at least partially cover a wearer's iris when the wearer is wearing the contact lens. The method further comprises providing a printer assembly having an inkjet print head, and using the printer assembly to deposit at least one colorant on the iris region of the contact lens in a manner to alter the appearance of the iris of the wearer when the wearer is wearing the contact lens.

13 Claims, 6 Drawing Sheets

U.S. PATENT DOCUMENTS

| | | |
|---|---|---|
| 5,757,458 A | 5/1998 | Miller et al. .................. 351/162 |
| 5,786,883 A | 7/1998 | Miller et al. .................. 351/162 |
| 5,819,661 A | 10/1998 | Lewis et al. .................. 101/467 |
| 5,887,247 A | 3/1999 | Baltus et al. ............. 455/279.2 |
| 5,936,704 A | 8/1999 | Gabrielian et al. ...... 351/160 R |
| 5,936,705 A | 8/1999 | Ocampo et al. ............. 351/162 |
| 6,030,078 A | 2/2000 | Ocampo ....................... 351/162 |
| 6,070,527 A | 6/2000 | Yamane et al. .............. 101/150 |
| 6,123,021 A | 9/2000 | Cameron ....................... 101/41 |
| 6,132,043 A | 10/2000 | Atkins et al. ................ 351/162 |
| 6,135,654 A | 10/2000 | Jennel ........................... 400/61 |
| 6,139,577 A | 10/2000 | Schleipman et al. ........ 623/6.64 |
| 6,143,026 A | 11/2000 | Meakem ....................... 128/898 |
| 6,196,683 B1 | 3/2001 | Quinn et al. ................. 351/162 |
| 6,197,409 B1 | 3/2001 | Bodager et al. ............. 428/212 |
| 6,276,266 B1 | 8/2001 | Dietz et al. .................... 101/41 |
| 6,315,410 B1 | 11/2001 | Doshi ........................... 351/162 |
| 2001/0050753 A1 * | 12/2001 | Tucker ......................... 351/177 |
| 2002/0039172 A1 | 4/2002 | Ocampo et al. ............. 351/162 |

* cited by examiner

COLORED CONTACT LENS AND METHOD OF MAKING SAME

BACKGROUND OF INVENTION

This invention relates to colored contact lenses and methods of making colored contact lenses.

Colored contact lenses are often used for cosmetic purposes to change the apparent color of a wearer's irises. For example, a person with brown or blue eyes desiring to have green eyes may wear green colored contact lenses to change the apparent color of a wearer's iris to green.

Conventionally, coloring of contact lenses for cosmetic purposes is achieved by printing a colored pattern onto a lens substrate via a pad printing process. The pad printing process employs a generally flat steel plate also known as a cliché. A pattern (or depression) is etched into the cliche by a photo-etching process. In operation, ink placed in the pattern is transferred to the lens substrate by a printing pad. To achieve a colored lens of multiple colors, different colored inks are placed into three or fewer different patterns and serially transferred to the lens substrate by printing pads.

A disadvantage associated with conventional methods of coloring contact lens substrates is that such methods cannot achieve patterns of high detail or resolution. In other words, the printed pattern on the lens substrate does not have nearly the detail of a human iris. The inability to achieve patterns of high resolution also prevents use of more than three different patterns on a lens substrate. As such, an observer viewing the wearer's eyes from less than five feet away may determine that the wearer is wearing colored lenses.

Knapp U.S. Pat. No. 4,582,402 discloses a contact lens substrate having an intermittent opaque pattern thereon with portions left uncolored to allow the wearer's iris to show through. Knapp discloses that the pattern is not visible to the naked eye when viewed from a distance of at least five feet by an ordinary viewer (i.e., a person having normal 20/20 vision). However, the ordinary viewer viewing the wearer's eyes from a closer distance might determine that the pattern is not a naturally occurring pattern. In other words, the ordinary viewer might correctly determine that the wearer is wearing colored contact lenses.

Jahnke U.S. Pat. No. 5,414,477 and O'Campo U.S. Pat. No. 5,963,705, like the Knapp patent, disclose contact lenses having opaque intermittent elements and noncolored regions through which significant portions of the wearer's iris structure are visible. These patents disclose making the intermittent elements of a single contact lens having up to three different color elements. However, because an actual human iris typically is an intricate looking structure having hundreds or thousands of different colors, contact lenses of these prior art patents allow the structure of the iris to show through the uncolored portions. One disadvantage of allowing significant portions of the wearer's iris to show through is that the visible portions of the wearer's iris combined with the visible portions of the intermittent pattern sometimes results in an unnatural looking iris. In particular, if the wearer's iris is dark brown and the colored elements of the contact lens pattern is light, the combination results in a pronounced, hyper-contrast which does not look natural.

SUMMARY OF INVENTION

Among the several objects and advantages of the present invention may be noted the provision of an improved colored contact lens; the provision of such a colored contact lens having an iris section colored in a manner to effectuate a change in the appearance of the wearer's iris but which makes the presence of the contact lens substantially imperceptible to an observer observing the wearer's eyes from a close distance; the provision of such a colored contact lens having a colorant image printed on the iris section of greater resolution than images printed on prior art colored contact lenses; the provision of a contact lens capable of effectuating a natural looking change in the appearance of the wearer's iris regardless of the actual color of the wearer's iris; the provision of a method of coloring a lens substrate in which the colored lens substrate more closely resembles a human iris than does a colored lens substrate made by conventional methods; and the provision of a method of coloring a lens substrate to form a colored lens having a pattern of greater intricacy.

Generally, a method of the present invention is for coloring a contact lens. The method comprises providing a contact lens having a pupil region and a generally annular-shaped iris region surrounding the pupil region, and providing a printer assembly having an inkjet print head. The iris region is adapted to at least partially cover a wearer's iris when a wearer is wearing the contact lens. The method further comprises using the printer assembly to deposit at least one colorant on the iris region of the contact lens in a manner to alter the appearance of the iris of the wearer when the wearer is wearing the contact lens.

Another aspect of the present invention is a colored contact lens comprising a non-opaque pupil region, a generally annular-shaped iris region surrounding the pupil region and adapted to cover at least 80% of a wearer's iris when the wearer is wearing the contact lens. At least first, second, third, and fourth colored patterns are on the iris region. The first colored pattern is of a first color. The second colored pattern is of a second color different than the first color. The third colored pattern is of a third color different than the first and second colors. The fourth colored pattern is of a fourth color different than the first, second and third colors. The colored patterns are arranged on the iris region in a manner to form an opaque composite pattern on the iris region. At least approximately 85% of the composite pattern is no more than one color layer thick. The composite pattern is configured and arranged to give the appearance of a natural iris when the wearer is wearing the colored contact lens, thereby providing a lens capable of altering the appearance of the iris of the wearer when the wearer is wearing the contact lens.

Another aspect of the present invention is a colored contact lens comprising a non-opaque pupil region, a generally annular-shaped iris region surrounding the pupil region and adapted to cover at least 80% of a wearer's iris when the wearer is wearing the contact lens. At least first, second, third, and fourth colored patterns are on the iris region. The first colored pattern is of a first color. The second colored pattern is of a second color different than the first color. The third colored pattern is of a third color different than the first and second colors. The fourth colored pattern is of a fourth color different than the first, second and third colors. The colored patterns are arranged on the iris region in a manner to form an opaque composite pattern on the iris region in which no portion of the composite pattern is more than two color layers thick. The composite pattern is configured and arranged to give the appearance of a natural iris when the wearer is wearing the colored contact lens, thereby providing a lens capable of altering the appearance of the iris of the wearer when the wearer is wearing the contact lens.

Another aspect of the present invention is a colored contact lens comprising a non-opaque pupil region, a generally annular-shaped iris region surrounding the pupil region and adapted to cover at least 80% of a wearer's iris when the wearer is wearing the contact lens. At least first, second, third, and fourth colored patterns are on the iris region. The first colored pattern is of a first color. The second colored pattern is of a second color different than the first color. The third colored pattern is of a third color different than the first and second colors. The fourth colored pattern is of a fourth color different than the first, second and third colors. The first colored pattern comprises a plurality of spaced-apart elements and the second colored pattern comprising a plurality of spaced-apart elements. The colored patterns are arranged on the iris region in a manner to form an opaque composite pattern covering at least 75% of the iris region. At least approximately 85% of the composite pattern is no more than two color layers thick. The composite pattern is configured and arranged to give the appearance of a natural iris when the wearer is wearing the colored contact lens, thereby providing a lens capable of altering the appearance of the iris of the wearer when the wearer is wearing the contact lens.

Another aspect of the present invention is a colored contact lens comprising a non-opaque pupil region and a generally annular-shaped iris region surrounding the pupil region and adapted to cover at least 80% of a wearer's iris when the wearer is wearing the contact lens. At least first, second, third, and fourth colored patterns are on the iris region. The first colored pattern is of a first color. The second colored pattern is of a second color different than the first color. The third colored pattern is of a third color different than the first and second colors. The fourth colored pattern is of a fourth color different than the first, second and third colors. The colored patterns are arranged on the iris region in a manner to form an opaque composite pattern on the iris region in which no portion of the first colored pattern overlaps with the second and third colored patterns and no portion of the second colored pattern overlaps with the third colored pattern. The composite pattern is configured and arranged to give the appearance of a natural iris when the wearer is wearing the colored contact lens, thereby providing a lens capable of altering the appearance of the iris of the wearer when the wearer is wearing the contact lens.

Another aspect of the present invention is a colored contact lens comprising a non-opaque pupil region and a generally annular-shaped iris region surrounding the pupil region and adapted to cover at least 80% of a wearer's iris when the wearer is wearing the contact lens. A multi-color composite pattern is on the iris region. The composite pattern comprises a plurality of distinct elements. Each of at least 25% of the elements have a surface area no greater than 6000 square microns.

Another aspect of the present invention is a colored contact lens comprising a non-opaque pupil region and a generally annular-shaped iris region surrounding the pupil region and adapted to cover at least 80% of a wearer's iris when the wearer is wearing the contact lens. A multi-color composite pattern is on the iris region. The composite pattern comprises a plurality of distinct elements. Each of at least 20% of the elements are within 50 $\mu$m of an adjacent one of the elements.

Another aspect of the present invention is a colored contact lens comprising a non-opaque pupil region and a generally annular-shaped iris region surrounding the pupil region and adapted to cover at least 80% of a wearer's iris when the wearer is wearing the contact lens. A multi-color composite pattern is on the iris region. The composite pattern comprises at least 3000 distinct elements.

Another aspect of the present invention is a colored contact lens comprising a non-opaque pupil region and a generally annular-shaped iris region surrounding the pupil region and adapted to cover at least 80% of a wearer's iris when the wearer is wearing the contact lens. A multi-color composite pattern is on the iris region. The composite pattern comprises at least twenty five different colors.

Other objects and features will be in part apparent and in part pointed out hereinafter.

DETAILED DESCRIPTION

Figure 1:
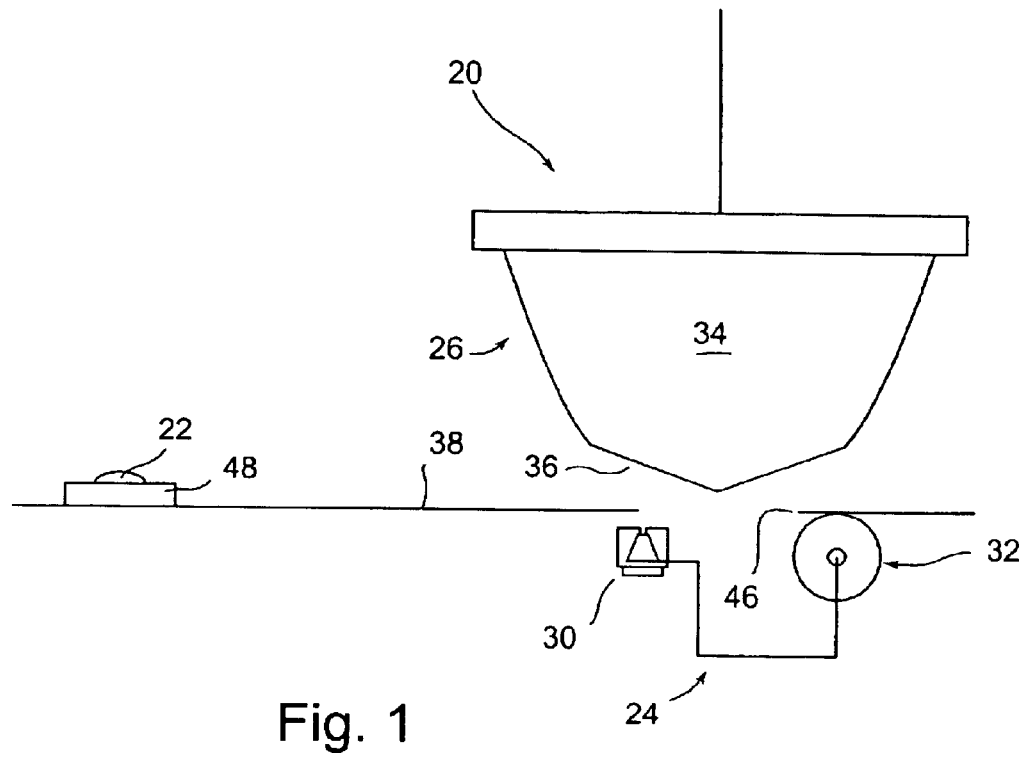
FIG. 1 is a schematic side elevational view of a printing apparatus of the present invention having an inkjet print mechanism and a pad printing transfer mechanism.

Referring now to the drawings, and first more particularly to FIGS. 1–5, a printing apparatus of the present invention is generally indicated by reference numeral 20. The printing apparatus 20 is adapted to deposit one or more colorants on a contact lens substrate, generally indicated at 22, in a manner to alter the appearance of the iris of a wearer when the wearer is wearing the contact lens substrate.

The printing apparatus 20 comprises an inkjet print mechanism, generally indicated at 24, and a pad printing transfer mechanism, generally indicated at 26. The inkjet print mechanism 24 comprises a plurality of inkjet print heads 30 and an advancing mechanism 32 for moving the print heads during a printing operation. Preferably, the print heads 30 are adapted to facilitate full color printing of a digital graphic image. The pad printing transfer mechanism 26 comprises a transfer pad 34 (preferably of silicone rubber) and a pad moving mechanism (not shown) for moving the pad. The printing apparatus 20 is adapted and configured to print a digital graphic image on a contact lens substrate 22. More particularly, the printing apparatus 20 is preferably operable to print a digital graphic image on a transfer surface 36 of the transfer pad 34 via the print heads 30, and then transfer the digital graphic image from the transfer surface to the contact lens substrate 22.

The inkjet print mechanism 24 is preferably of a conventional ink-jet printer, such as a thermal or bubble jet printer, a piezoelectric printer, a continuous flow printer, or a valve jet printer. The inkjet print mechanism 24 may be of a Hewlett Packard HP2000C inkjet printer, an Epson Stylist Color 880 printer, or any other suitable inkjet printer. The advancing mechanism 32 of the inkjet print mechanism 24 preferably comprises a print head carrier tractor ribbon of the commercially available inkjet printer, for laterally moving the print heads. The advancing mechanism 32 also includes a mechanism for moving the print heads longitudinally. The commercially available inkjet printers generally move a paper substrate longitudinally relative to the print heads via a friction paper feed mechanism while the print heads are moved laterally so that a two-dimensional image may be transferred to the paper substrate. In the preferred embodiment, the friction paper feed of the commercially available printer is modified to longitudinally move the print heads 30. Thus, the print heads 30 are moved laterally via the print head carrier tractor ribbon and moved longitudinally via the modified friction paper feed mechanism so that a two-dimensional image may be printed on the transfer pad 34. The pad printing transfer mechanism 26 may be of a Comek model # LC50 pad printer, commercially available from Pad Printing Machinery Of VT, Inc., Manchester Village, Vt., or any other suitable pad printing transfer mechanism.

The digital graphic image may be generated on any conventional computer (not shown) using commercially available software, such as Adobe Illustrator®, commercially available from Adobe Systems Incorporated of Palo Alto, Calif., or Paint Shop Pro™, commercially available from JASC Software, Inc. of Eden Prairie, Minn. The digital graphic image may be artistically rendered using the software, may be a scanned image, or may be generated by a digital camera. The computer preferably communicates with the printing apparatus 20 via any suitable data transfer device (e.g., conventional data transfer lines (not shown)) capable of transmitting digitally generated images electronically. The digital graphic image may be any suitable image to color a contact lens substrate. Preferably, the image is of the type and has the characteristics described below with reference to FIGS. 9–14.

Figure 2:
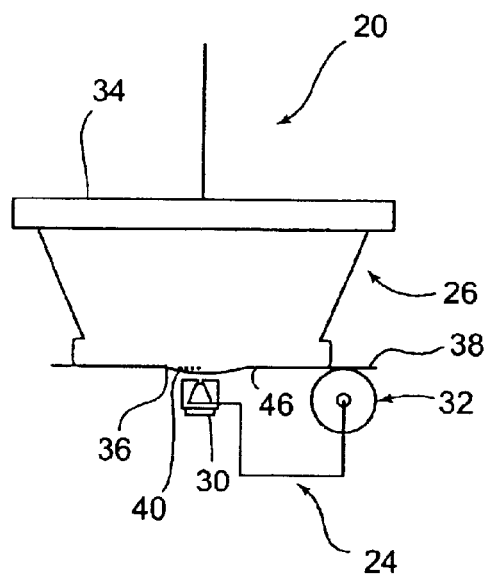
FIG. 2 is a schematic side elevational view of the printing apparatus of FIG. 1 showing inkjet print heads of the inkjet print mechanism depositing colorant on a transfer pad of the pad printing transfer mechanism.
Figure 3:
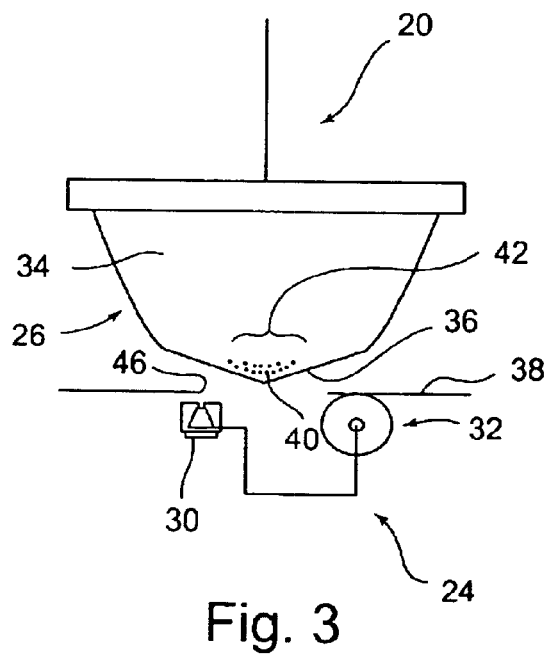
FIG. 3 is a schematic side elevational view of the printing apparatus of FIG. 2 showing the transfer pad spaced from the inkjet print mechanism after the colorant has been deposited on the transfer pad.
Figure 4:
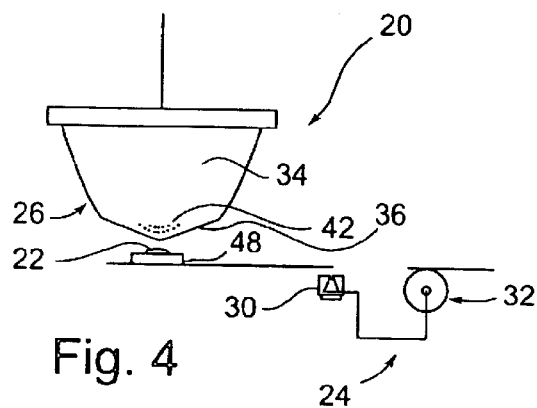
FIG. 4 is a schematic side elevational view of the printing apparatus of FIG. 3 showing the transfer pad with the colorant thereon brought into registration with a contact lens adapted to receive the colorant.
Figure 5:
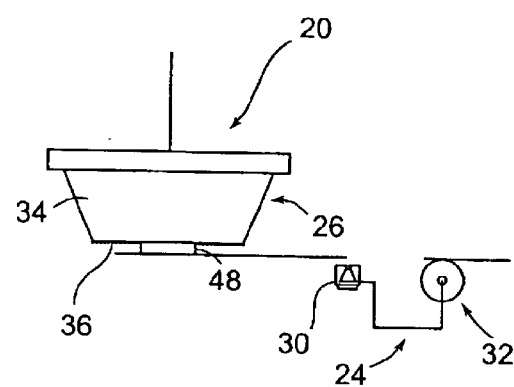
FIG. 5 is a schematic side elevational view of the printing apparatus of FIG. 4 showing the transfer pad pressed against the contact lens to transfer the colorant from the transfer pad to the contact lens.

Reference is again made to FIGS. 1–5 which illustrate operation of the printing apparatus 20. As shown in FIG. 1, the transfer pad 34 is brought into registration with the print heads 30. The transfer pad 34 is then pressed against a print platform 38 of the printing apparatus 20 to compress the pad such that the pad's transfer surface 36 is substantially flat (FIG. 2). The print platform 38 is between the print heads 30 and the transfer pad 34. An ink transfer port 46 through the print platform 38 allows communication between the print heads 30 and the transfer pad 32 to enable the print heads to deposit colorants (e.g., inks) 40 onto the transfer surface 36. With the transfer pad 32 so positioned, the print heads 30 are then operated to deposit the colorants 40 on the transfer surface 36 to thereby print the digital graphic image onto the transfer surface. The digital graphic image is represented by the reference numeral 42. FIG. 3 shows the digital graphic image 42 on the transfer surface 36. The transfer pad 32 is then brought into registration (FIG. 4) with the contact lens substrate 22 held on a lens holder 48 and then pressed (FIG. 5) against the contact lens substrate to deposit the colorants 40 on the lens substrate. The transfer pad 32 is then released from the contact lens substrate 22 and the colorants 40 are allowed to dry. Thus, the digital graphic image 42 is transferred from the transfer surface 36 of the transfer pad 32 to the contact lens substrate 22.

The colorants 40 used for coloring the contact lens substrate 22 may be any suitable colorant of the type used for coloring contact lenses. The colorants may be more or less opaque depending on the degree of color change desired. The opacity may be varied by modifying the proportion of pigment to binder in the colorant. Highly opaque colorants may be desired in some applications, somewhat less opaque colorants may be desired in other applications, and colorants of different opacities may be desired in still others.

Although the method of FIGS. 1–5 has been described as coloring contact lenses, it is to be understood that the method may also be employed to color objects other than contact lenses. It is envisioned that such other objects could be any type of object to which an image is printed via a pad printing process.

Figure 6:
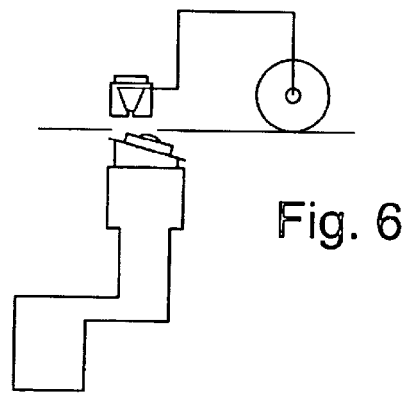
FIG. 6 is a schematic side elevational view of another embodiment of a printing apparatus of the present invention having an inkjet print mechanism and a lens support mechanism, the printing apparatus being adapted to directly apply colorants to a contact lens substrate, the lens support mechanism being shown tilting a lens holder to the right.
Figure 7:
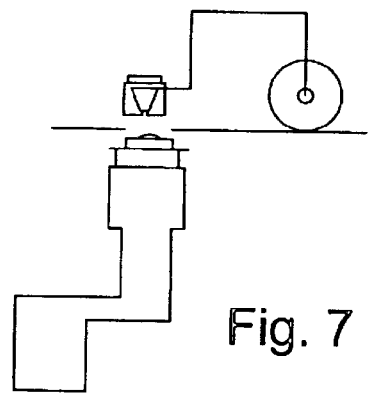
FIG. 7 is a schematic side elevational view of the printing apparatus of FIG. 6, but showing the lens support mechanism supporting the lens holder in an upright position.
Figure 8:
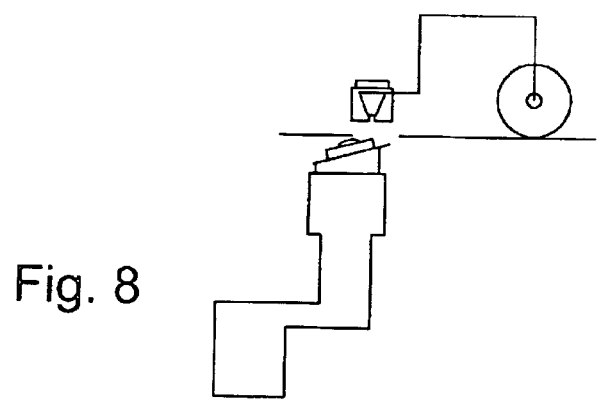
FIG. 8 is a schematic side elevational view of the printing apparatus of FIG. 6, but showing the lens support mechanism tilting the lens holder to the left.

Referring now to FIGS. 6–8, another printing apparatus of the present invention is indicated generally by the reference numeral 120. The purpose of the printing apparatus 120 is the same as that of the printing apparatus 20 of FIGS. 1–5, i.e., to print a digital graphic image on a contact lens substrate 22. Unlike the printing apparatus 20, the printing apparatus 120 is devoid of a transfer pad and prints the image directly on the contact lens substrate 22.

The printing apparatus 120 comprises an inkjet print mechanism, generally indicated at 124, and a lens support mechanism, generally indicated at 126. The inkjet print mechanism 124 comprises a plurality of inkjet print heads 130 and an advancing mechanism 132 for moving the print heads during a printing operation. The inkjet print mechanism 124 is the same as the inkjet print mechanism 24 of FIGS. 1–5. Thus, it is to be understood that the description above as to the print mechanism 24 is equally applicable to the print mechanism 124. The lens support mechanism 126 preferably comprises a pan and tilt mechanism, generally indicated at 134, and a lens holder 136. The pan and tilt mechanism may be of any suitable pan and tilt mechanism, such as Pan-Tilt Unit model PTU-46-17.5 with nodal (gimbal) option and software driver kit available in event driven ASCII commands for simplicity, or alternatively, the c++ developers kit to produce binary commands for speed, commercially available from Directed Perception, Inc., Burlingame, Calif. The outer surface of the contact lens substrate 22 is convex. To achieve proper image transfer to the convex outer surface of the contact lens substrate 22, it is desirable that the print heads 130 are at a constant distance from the portion of the lens surface to which colorant is being deposited. The pan and tilt mechanism 134 moves the lens holder 136 and the contact lens substrate 22 thereon while the print heads 130 are depositing colorant on the lens surface. As shown in FIG. 6, the pan and tilt mechanism 134 tilts the lens holder 136 to the right relative to the print heads 130 when the print heads deposit colorant on leftward portions of the outer surface of the contact lens substrate 22. As shown in FIG. 8, the pan and tilt mechanism 134 tilts the lens holder 136 to the left relative to the print heads 130 when the print heads deposit colorant on rightward portions of the outer surface of the contact lens substrate 22. Although not shown, it is to be understood that the pan and tilt mechanism also tilts the lens holder 136 forward and back relative to the print heads 130 when the print heads deposit colorant on rearward and forward portions of the outer surface of the contact lens substrate 22. Thus, the advancing mechanism 132 moves the print heads 130 laterally and longitudinally while the pan and tilt mechanism tilts the lens holder 136 and contact lens substrate 22 laterally and longitudinally so that the distance between print heads and the portion of the contact lens substrate to which colorants are being deposited remains substantially constant.

Although the printing apparatus 120 has been described as moving the contact lens substrate 22 while the graphic image is being deposited on the substrate to maintain the same distance, it is to be understood that the printing apparatus 120 could be modified in a manner to maintain the distance by moving the print heads alone while keeping the substrate stationary.

Also, although the method of FIGS. 6–8 has been described as being employed for coloring contact lenses, it is to be understood that the method may also be employed to color objects other than contact lenses. It is envisioned that such other objects could be any type of object upon which an image may be printed, especially objects having convex or concave printing surfaces. In such applications, it is to be understood that the lens holder would act as an object holder, and that the pan and tilt mechanism would tilt the object holder laterally and longitudinally. Because the pan and tilt mechanism tilts the object holder both laterally and longitudinally, the method of FIGS. 6–8 is even more especially useful for printing images on printing surfaces which are not linear in any cross section (e.g., ellipsoidal, spheroidal and paraboloidal sections).

Figure 9:
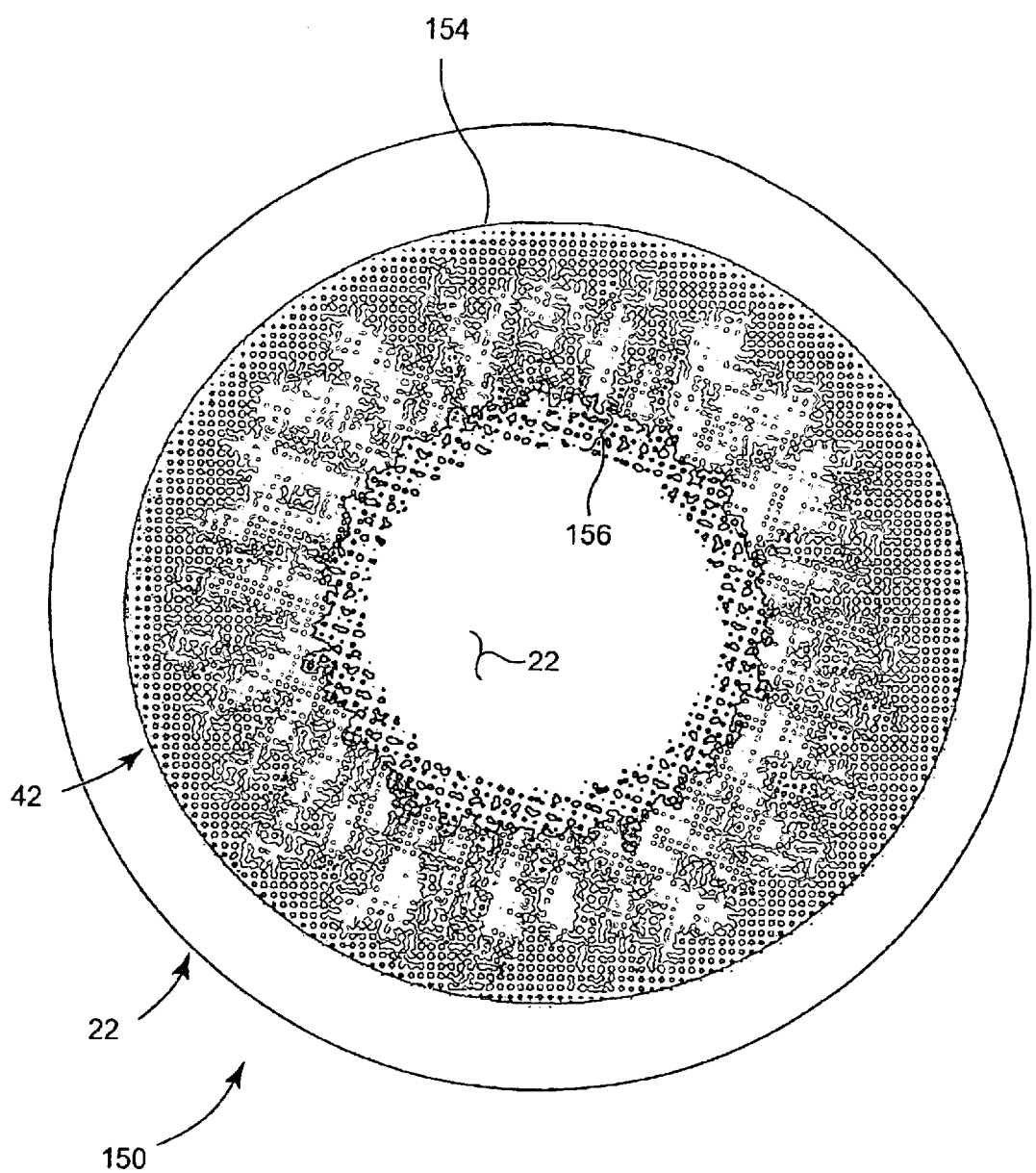
FIG. 9 is an enlarged front elevational view of a colored contact lens of the present invention comprising a contact lens substrate and a multi-color composite pattern printed on the contact lens substrate.
Figure 10:
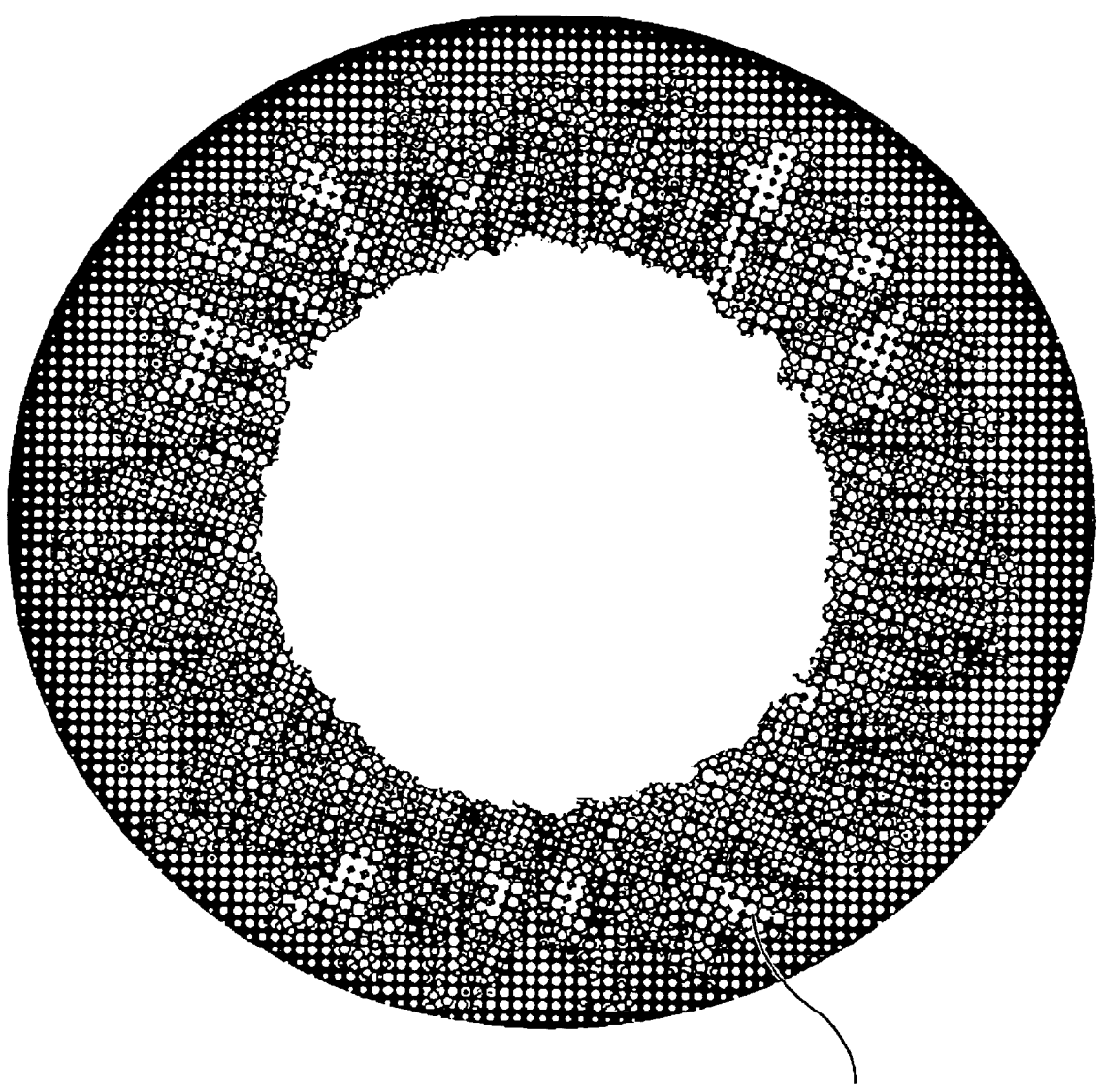
FIG. 10 is front elevational view of a first colored pattern of the multi-colored composite pattern of FIG. 9, the first colored pattern being of a first color.
Figure 11:
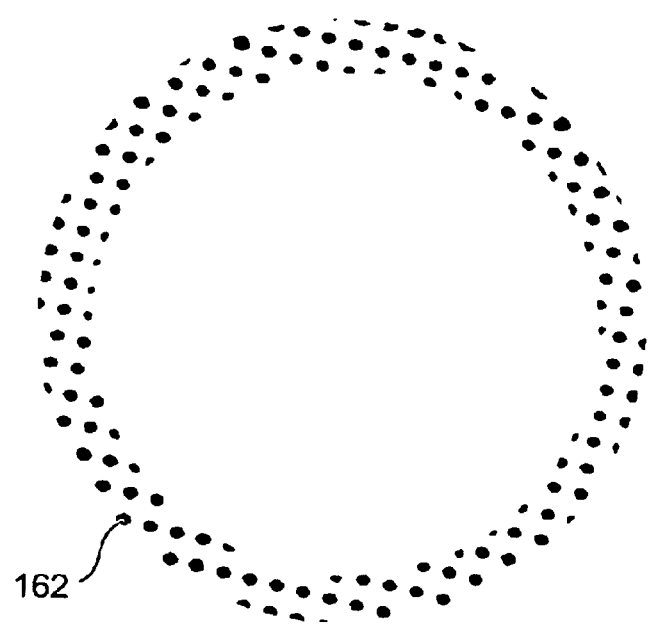
FIG. 11 is front elevational view of a second colored pattern of the multi-colored composite pattern of FIG. 9, the second colored pattern being of a second color different than the first color.
Figure 12:
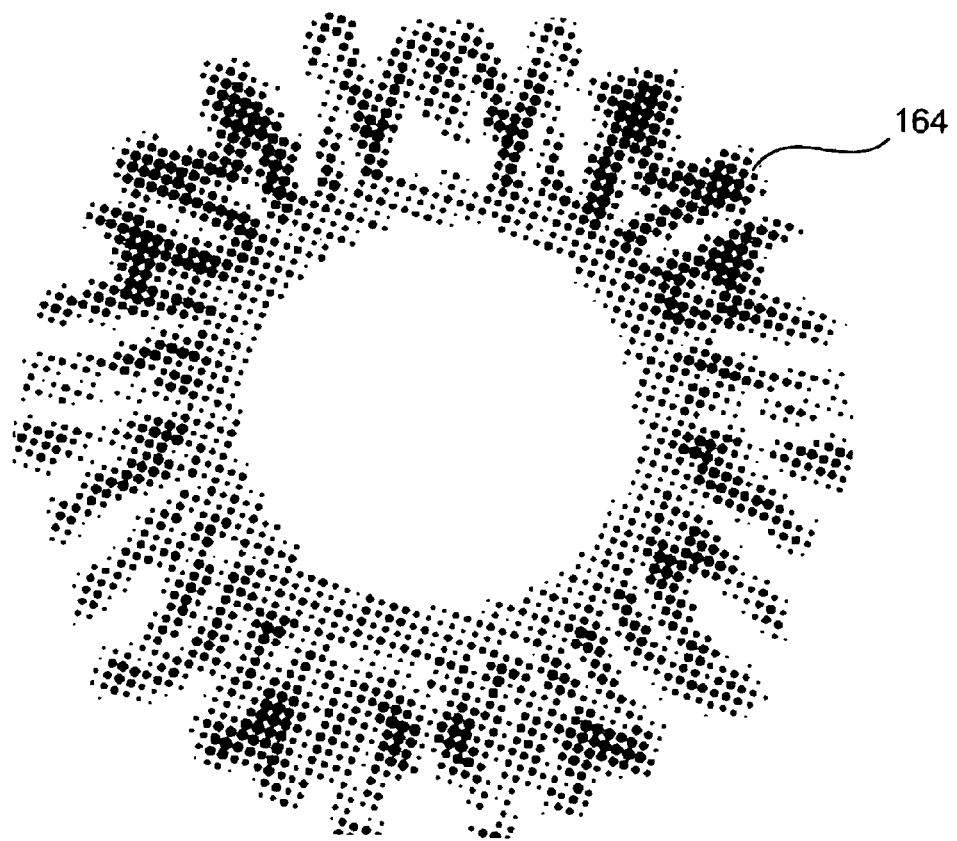
FIG. 12 is front elevational view of a third colored pattern of the multi-colored composite pattern of FIG. 9, the third colored pattern being of a third color different than the first and second colors.
Figure 13:
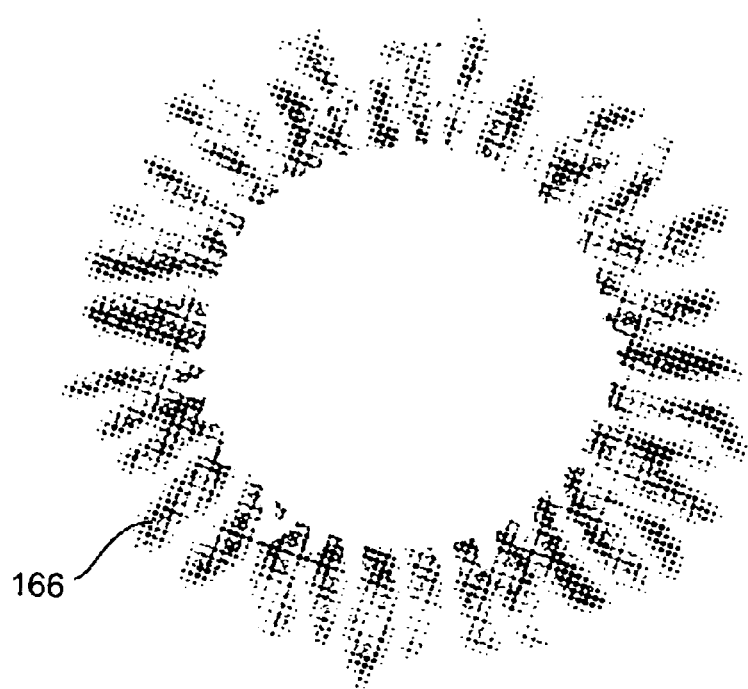
FIG. 13 is front elevational view of a fourth colored pattern of the multi-colored composite pattern of FIG. 9, the fourth colored pattern being of a fourth color different than the first, second and third colors.

Referring now to FIG. 9, an embodiment of a colored contact lens of the present invention is generally indicated at 150. The colored contact lens 150 comprises the contact lens substrate 22 and the digital graphic image 42. The contact lens substrate 22 comprises a non-opaque pupil region 152 and a generally annular-shaped iris region 154 surrounding the pupil region and adapted to cover at least 80% of a wearer's iris when the wearer is wearing the contact lens substrate. The contact lens substrate 22 further includes an annular-shaped transition region 156 between the pupil region 152 and iris region 154. The transition region 156 is sized and adapted to cover the area of the iris/pupil which varies with changes in light condition. Preferably, the digital graph image 42 comprises a multi-color composite pattern (also indicated by the reference number 42) printed on the iris region 154. The multi-color composite pattern 42 is configured and arranged to give the appearance of a natural iris when the wearer is wearing the color contact lens substrate 150. The composite pattern 42 covers preferably at least 30% of the iris region 154, more preferably at least 50% of the iris region, more preferably at 75% of the iris region, and more preferably at least 95% of the iris region. Preferably, only a relatively small percent, e.g., less than 50%, of the transition region 156 is covered by the composite pattern 42. Covering a small percent of the transition region 156 allows light to pass through the transition region and into the wearer's pupil when the wearer's pupils are dilated, but partially masks the wearer's iris when the wearer's pupils are contracted. The composite pattern 42 comprises a plurality of colored patterns each being of a different color. In this embodiment, the composite pattern 42 comprises first, second, third and fourth colored patterns 160, 162, 164, 166 meshed together. The four colored patterns are separately shown in FIGS. 10–13. The first colored pattern 160, shown in FIG. 10, is of a first color. The second colored pattern 162, shown in FIG. 11, is of a second color different than the first color. The third colored pattern 164, shown in FIG. 12, is of a third color different than the first and second colors. The fourth colored pattern 166, shown in FIG. 13, is of a fourth color different than the first, second and third colors. The colors chosen for the colored patterns 160, 162, 164, 166 depends on the iris color desired for the colored contact lens 150. If a colored contact lens capable of changing the appearance of a wearer's iris to blue is desired, then the colored patterns 160, 162, 164, 166 may have the following colors depicted by the CMYK color scheme: the first color may be 83% cyan, 51% magenta, 18% yellow, and 33% black; the second color may be 94% cyan, 81% magenta, 0% yellow, and 0% black; the third color may be 96% cyan, 61% magenta, 16% yellow, and 17% black; and the fourth color may be 37% cyan, 44% magenta, 95% yellow, and 53% black. If a colored contact lens capable of changing the appearance of a wearer's iris to aqua is desired, then the colored patterns 160, 162, 164, 166 may have the following colors depicted by the CMYK color scheme: the first color may be 49% cyan, 32% magenta, 23% yellow, and 19% black; the second color may be 84% cyan, 0% magenta, 22% yellow, and 0% black; the third color may be 91% cyan, 61% magenta, 23% yellow, and 29% black; and the fourth color may be 76% cyan, 36% magenta, 78% yellow, and 78% black. If a colored contact lens capable of changing the appearance of a wearer's iris to green is desired, then the colored patterns 160, 162, 164, 166 may have the following colors depicted by the CMYK color scheme: the first color may be 85% cyan, 32% magenta, 60% yellow, and 67% black; the second color may be 92% cyan, 13% magenta, 95% yellow, and 2% black; the third color may be 94% cyan, 31% magenta, 98% yellow, and 29% black; and the fourth color may be 53% cyan, 44% magenta, 98% yellow, and 53% black. Although precise colors have been disclosed it is to be understood that the above colors are merely exemplary. Other colors could be employed without departing from the scope of this invention.

Although shown in FIGS. 10–13 as being four separate patterns it is to be understood that the colored patterns 160, 162, 164, 166 may be printed on the contact lens substrate one at a time or simultaneously without departing from the scope of this invention. Also, although the composite pattern 42 of this embodiment is described as being of only four colored patterns, it is to be understood that the composite pattern may be of any number of colored patterns within the limits of the printing methods employed to color a contact lens substrate. If, for example, the contact lens substrate 22 is colored by either of the above-described inkjet printing methods, the composite pattern 42 may include hundreds of different colors.

If colored patterns are applied in a serial manner (e.g., a first color is printed on the lens substrate, then a second color is printed on the substrate, then a third color is printed on the substrate, etc.), then it is possible, but not necessarily desirable, to print one color layer on another color layer. Generally, multiple color layers on the contact lens substrate is undesirable because the increased layering often irritates a wearer's eyelid. Preferably, no portion of the composite pattern 42 is more than two color layers thick, and at least 85% of the composite pattern is no more than one color layer thick. More preferably, at least 95% of the composite pattern 42 is no more than one color layer thick. Most preferably, no portion of the composite pattern 42 is more than one color layer thick. In other words, it is most preferable that none of the colored patterns overlap.

Figure 14:
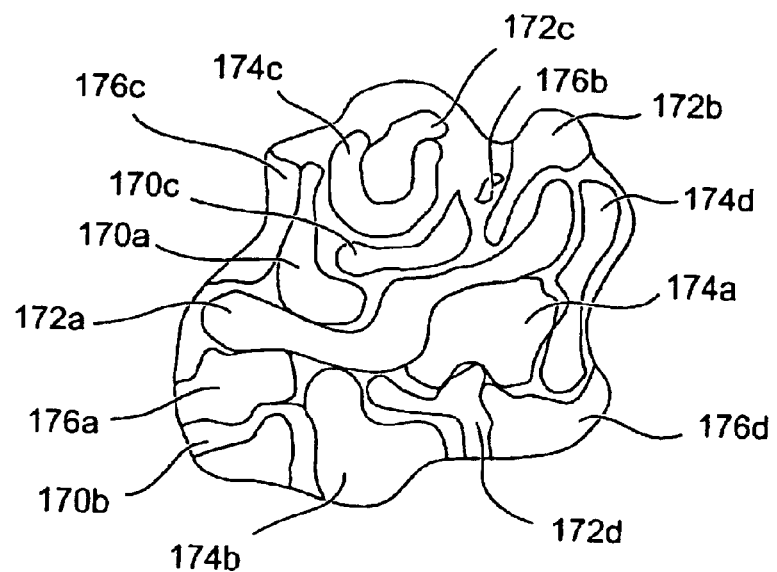
FIG. 14 is an enlarged, fragmented front elevational view of the multi-colored composite pattern of FIG. 9 showing some characteristics of the intricacy of the composite pattern.

The composite pattern 42 is sufficiently intricate and detailed makes the presence of the contact lens substrate substantially imperceptible to an observer observing the wearer's eyes, even when the observer is observing the wearer's eyes from a close distance (e.g., six inches away). In other words, the intricacy of the composite pattern is sufficient to change the apparent color of the wearer's iris in such a natural way that a close observer cannot detect that the wearer is wearing a colored contact lens substrate. FIG. 14 is an enlarged, fragmented front elevational view of the multi-colored composite pattern 42 showing some characteristics of the intricacy of the composite pattern. Preferably, the composite pattern 42 is comprised of a plurality of distinct elements. In FIG. 14, the distinct elements are indicated by reference numeral prefixes 170, 172, 174, 176 followed by alpha suffixes a, b, c, d. The prefixes are used herein for convenience to indicate which distinct elements are of the same color. In particular, all distinct elements indicated by the prefix 170 are of the first color, all distinct elements indicated by the prefix 172 are of the second color, all distinct elements indicated by the prefix 174 are of the third color, and all distinct elements indicated by the prefix 176 are of the fourth color. The suffixes are employed herein for convenience to distinguish one element of a color from another element of the same color.

Each distinct element is preferably spaced from other distinct elements of the same color. For example, element 170a is spaced from element 170b. However, a distinct element may border another distinct element of a different color. For example, element 170a of the first color borders element 172a of the second color and element 176c of the fourth color. Preferably, each colored pattern 160, 162, 164, 166 also comprises a plurality of distinct elements. However, it is to be understood that at least one pattern could be a single intricate element with spaces between portions of the element for meshing with elements of different colors. To achieve the desired intricacy, the composite pattern 42 of the colored contact lens 150 (FIG. 9) preferably comprises at least 800 distinct elements and more preferably comprises at least 3000 distinct elements. The distinct elements may be of different sizes and shapes. However, to achieve the desired intricacy, each of at least 25% of the distinct elements of the composite pattern 42 have a surface area preferably no greater than 6000 square microns, more preferably no greater than 4000 square microns, more preferably no greater than 2000 square microns, and more preferably no greater than 1000 square microns. The smallness of the surface area of the elements enables the composite pattern to have a more natural appearance than prior art colored contact lenses.

Another preferred characteristic of the composite pattern 42 is minimal spacing between adjacent distinct elements. Each of at least 20% of the distinct elements are preferably within 50 µm of an adjacent one of the elements, more preferably within 30 µm of an adjacent one of the elements, and more preferably within 10 µm of an adjacent one of the elements. Even more preferably, each of at least 30% of the distinct elements of the composite pattern 42 are within 10 µm of an adjacent one of the elements. As shown in FIG. 14, many of the distinct elements border another distinct element and are therefore spaced 0 µm of adjacent elements.

Providing the composite pattern 42 with the characteristics described herein allows the composite pattern to nearly completely mask the wearer's iris in a natural looking manner to enable the wearer to radically change the apparent color of his/her iris. For example, a wearer with brown eyes may insert into his/her eye the contact lens 150 having the composite pattern 42 adapted to give the appearance of a blue iris. Because the composite pattern 42 has the characteristics described herein, the composite pattern nearly completely masks the wearer's brown iris such that almost none of the wearer's iris is observable through the pattern. Also, because of the intricacy of the composite pattern 42, when the contact lens 150 is being worn by the wearer, the composite pattern will give the appearance of a natural iris, even when being observed from a close distance (e.g., six inches).

Although the composite pattern 42 has been described as comprising elements of four different colors, it is to be understood that the composite pattern could be comprised of twenty five different colored patterns, or 100 different colored patterns or even hundreds of different color patterns. Also, the different colored patterns may be printed on the contact lens substrate 22 either serially or simultaneously without departing from the scope of this invention. Further, the description of the composite pattern 42 being of a plurality of different colored patterns has been made for ease of understanding. In other words, it is not necessary to ever separate the multi-color composite pattern 42 into different colored patterns, at least not if all colors are applied to the lens substrate 22 simultaneously (i.e., in one single step).

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A colored contact lens comprising a non-opaque pupil region, a generally annular-shaped iris region surrounding the pupil region and adapted to cover at least 80% of a wearers iris when the wearer is wearing the contact lens, a multi-color composite pattern on the iris region, the composite pattern comprising a plurality of distinct elements, each of at least 25% of the elements having a surface area no greater than 6000 square microns.

2. A colored contact lens as set forth in claim 1 wherein each of at least 25% of the elements have a surface area no greater than 4000 square microns.

3. A colored contact lens as set forth in claim 1 wherein each of at least 25% of the elements have a surface area no greater than 2000 square microns.

4. A colored contact lens as set forth in claim 1 wherein each of at least 25% of the elements have a surface area no greater than 1000 square microns.

5. A colored contact lens as set forth in claim 1 wherein the composite pattern covers at least 30% of the iris region.

6. A colored contact lens as set forth in claim 1 wherein the composite pattern covers at least 50% of the iris region.

7. A colored contact lens as set forth in claim 1 wherein the composite pattern comprises at least 800 distinct elements.

8. A colored contact lens as set forth in claim 1 wherein the composite pattern comprises at least 3000 distinct elements.

9. A colored contact lens as set forth in claim 1 wherein each of at least 20% of the elements are within 50 $\mu$m of an adjacent one of the elements.

10. A colored contact lens comprising a non-opaque pupil region, a generally annular-shaped iris region surrounding the pupil region and adapted to cover at least 80% of a wearer's ins when the wearer is wearing the contact lens, a multi-color composite pattern on the iris region, the composite pattern comprising at least 3000 distinct elements.

11. A colored contact lens as set forth in claim 10 wherein each of at least 20% of the elements are within 50 $\mu$m of an adjacent one of the elements.

12. A colored contact lens comprising a non-opaque pupil region, a generally annular-shaped iris region surrounding the pupil region and adapted to cover at least 80% of a wearer's iris when the wearer is wearing the contact lens, a multi-color composite pattern on the iris region, the composite pattern comprising at least 3000 distinct elements, each of at least 20% of the distinct elements being within 10 $\mu$m of an adjacent one of the elements.

13. A colored contact lens as set forth in claim 12 wherein each of at least 30% of the elements are within 10 $\mu$m of an adjacent one of the elements.

\* \* \* \* \*